United States Patent [19]

Fitch

[11] Patent Number: 5,363,995
[45] Date of Patent: Nov. 15, 1994

[54] SLIDE GATE PLATE AND METHOD

[75] Inventor: Lawrence D. Fitch, Pittsburgh, Pa.

[73] Assignee: Indresco Inc., Dallas, Tex.

[21] Appl. No.: 167,318

[22] Filed: Dec. 14, 1993

[51] Int. Cl.$^5$ .............................................. B22D 41/32
[52] U.S. Cl. .................................... 222/600; 501/105
[58] Field of Search ...................... 266/236; 222/600; 501/105

[56] References Cited

U.S. PATENT DOCUMENTS

| | | | |
|---|---|---|---|
| 4,175,974 | 11/1979 | Grabner et al. | 106/58 |
| 4,179,046 | 12/1979 | Jeschke et al. | 222/600 |
| 4,182,466 | 1/1980 | Fehling et al. | 222/600 |
| 4,257,543 | 3/1981 | Muschner et al. | 222/600 |
| 4,424,955 | 1/1984 | Wells | 266/44 |
| 4,497,473 | 2/1985 | Robyn et al. | 266/44 |
| 5,007,615 | 4/1991 | Kernion et al. | 222/600 |
| 5,072,864 | 12/1991 | Luhrsen et al. | 222/600 |
| 5,214,010 | 5/1993 | Whittemore | 501/105 |

FOREIGN PATENT DOCUMENTS 56-165559  12/1981  Japan .

Primary Examiner—Scott Kastler
Attorney, Agent, or Firm—John L. Sigalos

[57] ABSTRACT

A slide gate plate comprising a burned refractory that is impregnated with tar and baked, said refractory made from a composition comprising about 70 to 95 wt. % alumina, 1 to 10 wt. % reactive alumina, 1 to 5 wt. % volatilized silica, and, 3 to 15 wt. % silicon carbide and the method of increasing the service life of such slide gate plate by forming the same from the above-noted composition.

20 Claims, No Drawings

SLIDE GATE PLATE AND METHOD

BACKGROUND OF THE INVENTION

The present invention relates to slide gate plates and to the method of increasing the service life of burned alumina refractory slide gate plates which have been tar impregnated and baked.

Slide gate assemblies are well known devices utilized with metal working vessels and usually comprise at least one stationary refractory plate with a passage therethrough and at least one sliding refractory plate with a passage therethrough suitably engaged with the stationary plate. The sliding refractory plate is moved by suitable means in order to align the respective passages to permit discharge of molten metal from the metal working vessel. One of the major problems with such plates is that the portions thereof that are exposed to the molten metal are very susceptible to wear. Efforts to increase their wear resistance and, hence, the service life of the slide gate plates has been an ongoing concern. The high temperature and corrosive action of the molten metal passing through the passages in the slide gate plates tends to limit their service life.

A number of different types of refractory materials, including those based on magnesite and alumina, have been utilized as the refractory for such gates and it has been found that under most conditions the most suitable refractories are the alumina based refractories. In an effort to increase the wear resistance, both burned and unburned alumina refractories, which have also been tar impregnated and baked have been utilized and it has been found that most suitably the refractory slide gate plate once formed is preferably impregnated with tar. While such tar impregnated plates are superior to unimpregnated high alumina slide gates, further improvements in service life are desired.

One of the problems noted is that under the high temperature conditions to which the slide gates are employed there is rapid oxidation of the carbon derived from tar or pitch used to impregnate the plate, and this oxidation shortens the service life of the slide gate plate.

SUMMARY OF THE INVENTION

The present invention overcomes the problems of the prior art and results in burned, tar impregnated, and baked alumina slide gates having increased service life.

Briefly, the present invention comprises a slide gate plate comprising a burned refractory that is impregnated with tar and baked, said refractory made from a composition comprising about 70 to 95 wt. % alumina, 1 to 10 wt. % reactive alumina, 1 to 5 wt. % volatilized silica, 3 to 15 wt. % silicon carbide, and up to 30 wt. % of a spall inhibitor, the amount of alumina utilized being reduced by the amount of spall inhibitor used.

The invention also comprises the method of increasing the service life of a burned, tar Impregnated, and baked alumina refractory slide gate plate comprising forming said refractory slide gate plate from a composition comprising about 70 to 95 wt. % alumina, 1 to 10 wt. % reactive alumina, 1 to 5 wt. % volatilized silica, 3 to 15 wt. % silicon carbide, and up to 30 wt. % of a spall inhibitor, the amount of alumina utilized being reduced by the amount of spall inhibitor used and then burning, tar impregnating, and baking said slide gate plate.

DETAILED DESCRIPTION

As has been noted, slide gate assemblies ordinarily are composed of refractory plates, at least one of which is stationary and at least one of which is sliding. As the sliding portion is moved it will bring passages in each of the plates in alignment for discharge of the metal from the vessel in which the metal is held. As is known, and as is evident, there are a large number of different types of slide gates and these utilize various shaped stationary and movable plates. Thus, the instant invention while directed to slide gate plates can be of any shape and can be either a stationary or movable plate. Thus, the instant invention is applicable to refractory slide gate plates of any size and shape and they can be shaped in the conventional manner used to form slide gate plate shades.

The composition from which the refractory is made is primarily a high alumina refractory, one that comprises about 70 to 95 wt. % of alumina, 1 to 10 wt. % reactive alumina, 1 to 5 wt. % volatilized silica, and 3 to 15 wt. % silicon carbide. Other materials conventionally used in slide gates can be added in their usual amounts, such as 10 to 30 wt. % of conventional spall inhibitors like AZS (alumina-zirconia-silica) grains or coarse mullite grains which can be either sintered or fused. The amount of alumina is reduced by the amount of the spall inhibitor added. What is essential is that the major refractory component be alumina, and preferably a tabular alumina although, as noted, combinations of calcined and tabular alumina can be utilized, and that the reactive alumina, volatilized silica and SiC also be used. It is preferable to utilize a $-6$ mesh grain through fines with respect to the alumina, $-325$ mesh as to the calcined and reactive alumina, and with respect to the silicon carbide, coarser grains, namely $-40$ to $+170$ mesh, preferably 50 to 100 mesh can be used, although slightly finer sizes may be utilized. All mesh sizes discussed herein are Tyler mesh sizes, except for the mesh sizes for SiC which are American ASTM E 11-87 mesh sizes.

In forming the refractory it is conventional to have the usual plus additions to act as pressing aids and to bond the composition after it has been shaped and before it as burned. Examples of such suitable materials include methyl cellulose, polyethylene glycol, or dextrin (corn starch).

Water is also added as needed in order to place the mix into the proper consistency so it can be readily shaped.

After the composition has been formed into the shape desired for a particular refractory slide gate plate it is then burned at the temperatures conventional for this purpose, namely about 2200° to 2600° F. then tar impregnated in the conventional manner in a tar impregnator. As used herein the term "tar impregnation" includes tar, pitch, and the like, which are the usual hydrocarbon materials used to impregnate refractories. The resultant impregnated slide gate plate is then baked, ordinarily at a temperature to about 400° to 1000° F., in order to remove the volatiles.

The invention will be further described in connection with the following examples which are set forth for purposes of illustration only.

EXAMPLES 1 TO 6

A series of six refractory mixes were prepared with compositions 1 to 3 in which there was no tar impregnation and examples 4 to 6 in which there was tar impregnation. All of the mixes were tempered with the same amount of binder and pressed at 18,000 psi on a Lassman press and burned at 2400° F. Test brick were made from each mix and a portion were then tested as is (Examples 1 to 3) and a portion tar impregnated and baked (Examples 4 to 6). Thus, the mix formulations for Examples 4, 5, and 6 correspond identically to those of Examples 1, 2, and 3, respectively.

Tar impregnation was carried out using 240° F. petroleum pitch in a conventional tar impregnator at 420° F. The brick were held under vacuum for ½ hour, the pitch introduced and then vacuum held for another ½ hour, followed by pressurizing to 80 psi for one hour. The test brick were then baked at 500° F.

The mix compositions and test results are set forth Table I below. The percentages of the components are in wt. %.

TABLE I

| Example No. | 1 | 2 | 3 | 4 | 5 | 6 |
|---|---|---|---|---|---|---|
| Mix: | | | | | | |
| Tabular Alumina, −6/10 mesh | | 5% | | — | — | — |
| 10/24 | 13 | 16 | 18 | — | — | — |
| 24/48 | 13 | 10 | 8 | — | — | — |
| −48 | | 24 | | — | — | — |
| Coarse Mullite Grain, 10/28 mesh | 20 | 17 | 15 | — | — | — |
| Calcined Alumina, −325 mesh | | 15 | | — | — | — |
| Volatilized Silica | 5 | 3 | 5 | — | — | — |
| Reactive Alumina, −325 mesh | | 5 | | | | |
| SiC, −50/100 mesh | — | 5 | 5 | — | — | — |
| Plus Additions: | | | | | | |
| Methylcellulose | | 0.5 | | — | — | — |
| Polyethylene glycol | | 0.2 | | — | — | — |
| Water | | 2.9 | | — | — | — |
| Forming Pressure, psi | | 18,000 | | | | |
| Pressed Bulk Density, pcf | 188 | 190 | 189 | — | — | — |
| Green Modulus of Rupture, psi | 41 | 31 | 36 | — | — | — |
| Burn: 2400° F., 10 Hour Hold | | | | | | |
| % Linear Change in Burning: | −0.1 | 0.0 | 0.0 | — | — | — |
| Modulus of Rupture, psi | | | | | | |
| At Room Temperature: | 2240 | 1950 | 2080 | — | — | — |
| At 1500° F.: | — | — | — | 2240 | 2000 | 2130 |
| At 2700° F.: | 1290 | 940 | 1270 | 1430 | 1080 | 1480 |
| Bulk Density, pcf: | 183 | 184 | 183 | 189 | 189 | 189 |
| Apparent Porosity, %: | 18.4 | 18.5 | 18.1 | 13.4 | 13.5 | 13.4 |
| Apparent Specific Gravity: | 3.59 | 3.61 | 3.57 | 3.49 | 3.51 | 3.49 |
| Modulus of Elasticity, psi × 10$^6$: | 4.69 | 4.05 | 4.29 | — | — | — |
| POFI Test | | | | | | |
| Degree of Cracking: | None | None | None | — | — | — |
| Degree of Surface Spalling: | None | None | None | — | — | — |
| Rating: | Pass | Pass | Pass | — | — | — |
| Loss of Strength after 5 Cycles from 2200° F. to Air: | | | | | | |
| MOR, Before Cycling, psi: | 1920 | 1750 | 1760 | — | — | — |
| MOR, After Cycling, psi: | 1720 | 1480 | 1650 | — | — | — |
| % Loss of Strength: | 10 | 15 | 6 | — | — | — |

Chemical analysis for total and free carbon was conducted on each one of the test pieces and the results are set forth in Table II.

TABLE II

| Example No. | 1 | 2 | 3 | 4 | 5 | 6 |
|---|---|---|---|---|---|---|
| **Total Carbon*, Wt. %** | | | | | | |
| After Impregnation and baking: | — | — | — | 2.63 | 3.93 | 3.84 |
| After 2700° F. MOR: | — | — | — | 0.22 | 2.31 | 1.88 |
| **Free Carbon*, Wt. %** | | | | | | |
| After Impregnation and baking: | — | — | — | 2.60 | 2.67 | 2.48 |
| After 2700° F. MOR: | — | — | — | 0.12 | 1.18 | 0.73 |
| Wt. % SiC (Calculated)** | | | | | | |
| After Impregnation and baking: | — | — | — | 0.1 | 4.2 | 4.5 |
| After 2700° F. MOR: | — | — | — | 0.3 | 3.8 | 3.8 |

*Analysis by Leco
**(TC − EC) × (3.33)

From a review of the free carbon analysis, it will be evident that after the 2700° F. MOR test, which can be viewed as a high temperature oxidation test, Mix 4 which did not contain SiC had lost essentially all of the carbon derived from tar Impregnation, whereas Mixes 5 and 6 which contained the SiC addition surprisingly and unexpectedly retained a significant level of carbon derived from tar impregnation. In other words, a mix without silicon carbide (Mix 4) after exposure to a high temperature, oxidizing conditions, lost 95% of its carbon (2.6%→0.2%), whereas a mix containing silicon carbide, for example Mix 5, only showed a 56% loss of carbon (2.67%→1.18%). This unexpected benefit of the SiC addition to the other components of the mix is the essence of this invention.

EXAMPLE 7

A field trial was carried out using a commercial rotary slide gate assembly with the tar impregnated refractory slide gate being that of Example 5 above. A total of 10 sets (1 fixed plate and 1 slide plate in each set) were utilized; the bore in the plates being 70 mm. The plates were compared with plates of the identical size, but made from the refractory composition of Example 1 which was also tar impregnated as Example 4.

It was found that whereas the tar impregnated plates without the silicon carbide addition could be used for only three heats in the vessel, the plates in accord with the present invention all gave four heats.

There was, thus, a 33% increase in useful life of the slide plates.

While the invention has been described in connection with a preferred embodiment, it is not intended to limit the scope of the invention to the particular form set forth, but on the contrary, It is intended to cover such alternatives, modifications, and equivalents as may be included within the spirit and scope of the invention as defined by the appended claims.

What is claimed is:

1. A slide gate plate comprising a burned refractory that is impregnated with tar and baked, said refractory made from a composition consisting essentially of about 70 to 95 wt. % alumina, 1 to 10 wt. % reactive alumina, 1 to 5 wt. % volatilized silica, and, 3 to 15 wt. % silicon carbide, and up to 30 wt. % of a spall inhibitor, the amount of alumina utilized being reduced by the amount of spall inhibitor used.

2. The slide gate plate of claim 1 wherein said alumina is a tabular alumina or a combination of tabular and calcined alumina and said spall inhibitor is coarse mullite or coarse alumina-zirconia-silica (AZS) grains.

3. The slide gate plate of claim 2 wherein said alumina is a tabular alumina having a grain size of about −6 mesh and finer.

4. The slide gate plate of claim 1 wherein the reactive alumina has a grain size no greater than about −325 mesh.

5. The slide gate plate of claim 2 wherein the calcined alumina and reactive alumina each have a grain size no greater than about −325 mesh.

6. The slide gate plate of claim 1 wherein the silicon carbide has a grain size of at least −40 mesh.

7. The slide gate plate of claim 2 wherein the silicon carbide has a grain size of at least −40 mesh.

8. The slide gate plate of claim 3 wherein the silicon carbide has a grain size of at least −40 mesh.

9. The slide gate plate of claim 4 wherein the silicon carbide has a grain size of at least −40 mesh.

10. The slide gate plate of claim 5 wherein the silicon carbide has a grain size of at least −40 mesh.

11. A method of increasing the service life of a burned, tar Impregnated, and baked alumina refractory slide gate plate comprising forming said refractory slide gate plate from a composition consisting essentially of about 70 to 95 wt. % alumina, 1 to 10 wt. % reactive alumina, 1 to 5 wt. % volatilized silica, 3 to 15 wt. % silicon carbide and up to 30 wt. % of a spall inhibitor, the amount of alumina utilized being reduced by the amount of spall inhibitor used, then burning, tar impregnating, and baking said slide gate plate.

12. The method of claim 11 wherein said alumina is a tabular alumina or a combination of tabular and calcined alumina and said spall inhibitor is coarse mullite or coarse alumina-zirconia-silica (AZS) grains.

13. The method of claim 12 wherein said alumina is a tabular alumina has a grain size of about −6 mesh and finer.

14. The method of claim 11 wherein the reactive alumina has a grain size no greater than about −325 mesh.

15. The method of claim 12 wherein the calcined alumina and reactive alumina each have a grain size no greater than about −325 mesh.

16. The method of claim 11 wherein the silicon carbide has a grain size of at least −40 mesh.

17. The method of claim 12 wherein the silicon carbide as a grain size of at least −40 mesh.

18. The method of claim 13 wherein the silicon carbide has a grain size of at least −40 mesh.

19. The method of claim 14 wherein the silicon carbide has a grain size of at least −40 mesh.

20. The method of claim 15 wherein the silicon carbide has a grain size of at least −40 mesh.

* * * * *